Patented Mar. 1, 1927.

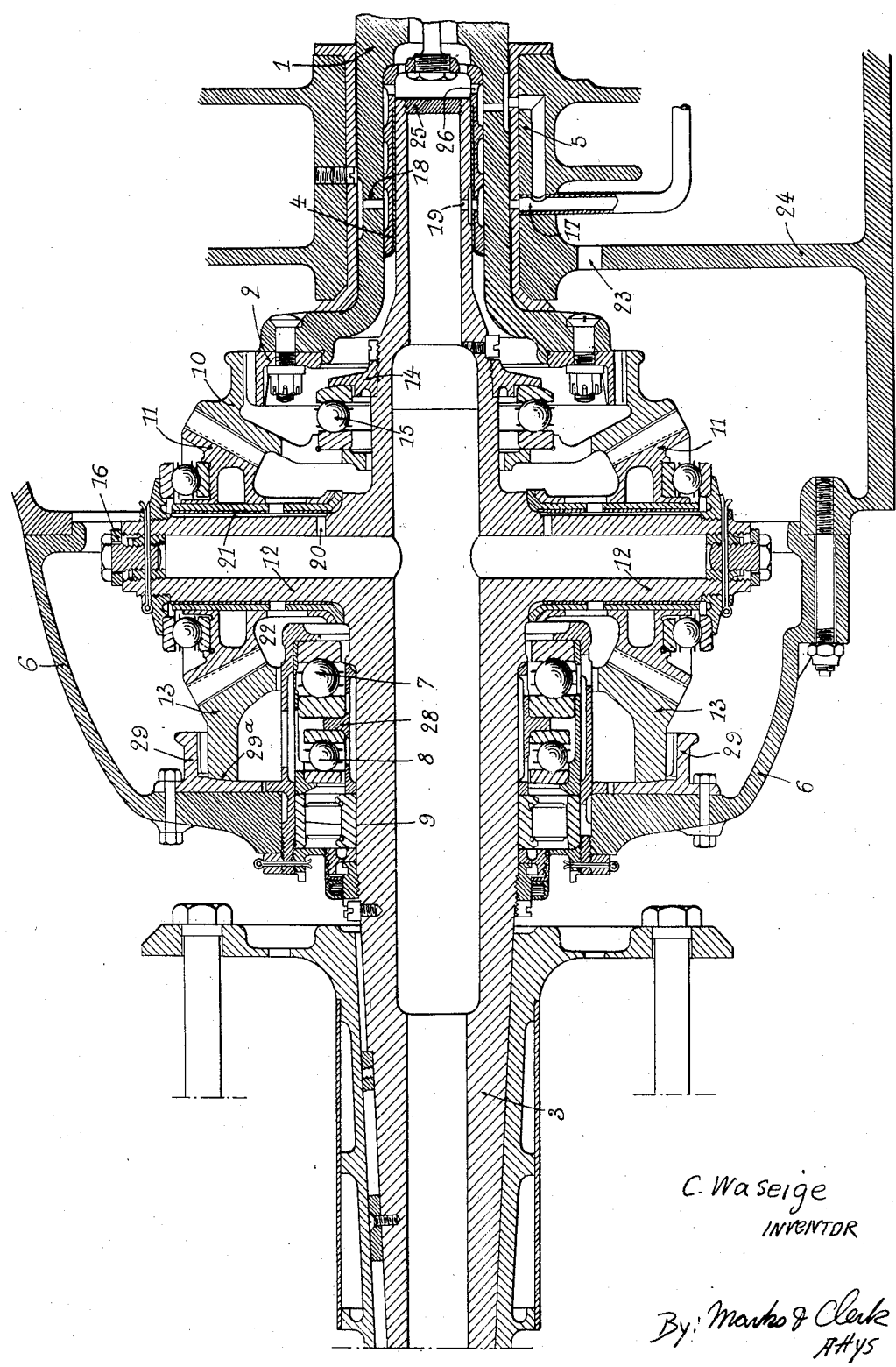

1,619,552

UNITED STATES PATENT OFFICE.

CHARLES WASEIGE, OF RUEIL, FRANCE.

SPEED-REDUCING GEAR.

REISSUED

Application filed April 1, 1926, Serial No. 99,086, and in France April 23, 1925.

The invention relates to speed-reducing gears, in particular to speed-reducing gears for the propellers of aircraft, of the known type comprising a set of differential bevel gears in which the engine shaft drives a toothed ring coacting with planetary pinions mounted loose upon arms secured to the propeller shaft, the said pinions rolling upon a stationary toothed ring.

One feature of the invention resides in that the movable toothed ring, which rotates together with the engine shaft, is axially movable, its axial motion being limited by a stop piece by means of which the engagement of the said ring with the planetary pinions may be adjusted independently of the engine shaft.

Another feature of the invention is that the said movable toothed ring is floating upon the engine shaft, and is centered solely by the engagement of its teeth with the teeth of the planetary pinions, whereby the driving effort will be distributed upon several teeth, and the transmission of the jarring effects of the engine shaft to the gearing will be obviated.

A further feature of this invention consists in that a spacing ring serves to connect together the outer ends of the arms carrying the planetary pinions, thus preventing the flexion of any one of the arms independently of the others.

A still further featue of the invention resides in that the rear end of the propeller shaft is mounted in a bearing which is disposed within the hollow part of the engine shaft which is itself contained within the bearing for the said shaft.

According to a still further feature of the invention, means are provided whereby the lubrication is such that the oil is supplied to the centre of the propeller shaft by means of channels formed in the bearing of said shaft adjacent the engine shaft. and is delivered to the several parts by means of ducts which are so disposed that the centrifugal force will facilitate the oil circulation and furthermore the gear rotates in an oil bath. Inasmuch as the movable toothed ring is axially movable, this provides for the adjustment of the gear-engagement of the stationary toothed ring with the planetary pinions, independently of the engine shaft. In short, this speed-reducing mechanism is adjustable in an entirely independent manner.

The appended drawing shows by way of example a speed-reducing mechanism comprising epicycloidal bevel gearing, improved in accordance with the invention.

The end of the driving shaft 1 comprises an enlarged or flaring portion to which is bolted the wheel 2, the periphery of which is provided with flutes; the said shaft is further provided with a bore for the mounting of the propeller shaft 3. This latter is mounted in a bearing disposed within the part of the shaft 1 which is supported in the bearing 5 of the latter. The propeller shaft 3 is mounted in a second bearing which is secured to the casing 6 and comprises two circular rows of balls 7 and 8 adapted to receive the axial thrust, and a circular set of rollers 9.

A toothed bevel wheel 10 can be rotated by the wheel 2, said wheel being provided with flutes adapted to co-operate with those of the wheel 2. It will be noted that the wheel 10 is floating upon the shaft 3, i. e. is not directly supported by any of said shafts 1 or 3; the flutes of the wheels 2 and 10 are so disposed as to allow a certain play and to permit the wheel 10 to take a slightly eccentric and inclined position if necessary.

The wheel 10 engages the planetary pinions 11 which are mounted loose on arms 12 secured to the propeller shaft 3, and engage the toothed wheel 13 which is secured to the casing 6 of the speed reducing mechanism; said wheel 13 may be mounted in a manner analogous to the wheel 10. An internally fluted wheel 29 is bolted to the casing 6, and the wheel 13 is provided with flutes corresponding—with a certain play—to those of the wheel 29; the contact surface between the wheel 29 and the wheel 13 is spherical.

Since the wheel 10 can be transversely displaced, it can be brought into the exact position required for its correct gear engagement with the planetary pinions 11, and it is centered solely by the engagement of its teeth with the teeth of the planetary pinions. It results therefrom that, at any time, the driving effort is distributed upon all the teeth of the wheel 10 which are in gear engagement with teeth of the pinions 11. Moreover since the wheel 10 is floating, the vibrations of the driving shaft 1 can by no means be transmitted to the parts of the reducing gear.

The axial displacement of the toothed wheel 10 is limited in one direction by the planetary pinions 11 and in the other by the abutment 14 against which the wheel 10 is pressed, with the interposition of a ball bearing 15 with spherical bearing surface. The said abutment consists of a tapped ring which is screwed upon the propeller shaft and whose position upon the shaft can thus be varied, so that the position of the wheel 10 relatively to the said planetary pinions can also be varied.

The gear engagement of the wheel 13 with the planetary pinions is adjusted either by varying the thickness of the spacing ring 28 or by varying its position with reference to the propeller shaft, and this by displacing the latter with reference to the casing 6.

The propeller shaft and the movable wheel 10 are slidable with respect to the driving shaft 1, and all the adjusting operations can be carried out independently of the driving shaft.

A ring 16 connects together the outer ends of the arms 12 carrying the planetary pinions 11 so as to hold the said arms and to prevent any one of them from bending independently of the others.

The lubricating oil is constantly supplied through the conduit 17 into the bearing 5, thus oiling the bearing of the driving shaft, and then through the ports 18 in the driving shaft, thus entering the bore of the driving shaft; the oil thus lubricates the inner bearing 4, and proceeds through the ports 19 into a suitable chamber in the propeller shaft.

In this manner the interior of the said shaft will be filled with oil; the latter will be circulated through the ports 20 to lubricate the bearings 21 of the planetary pinions 11, being discharged thence through the port 22. The oil will now drop to the bottom of the casing 6 in which it will accumulate up to the level of the aperture 23 in the tight partition 24 separating the speed-reducing mechanism from the interior of the engine crankcase. By this disposition, the mechanism will rotate in an oil bath whereby the proper lubrication is assured. The oil bath will not heat up, for it is cooled by the continuous supply at the central part of the propeller shaft and by the discharge through the overflow 23.

The lubrication through the central part of the propeller shaft is entirely separated by the plug 25, from the general lubrication of the engine shaft; this latter lubrication is effected through the ports 26 which are supplied from the same source, but is entirely independent from the lubrication of the reducing gear, from the bearing 5 onward.

Having now described my invention what I claim as new and desire to secure by Letters Patent is:

1. In combination with a driving shaft and a driven shaft: a differential speed reducing mechanism comprising a rotary bevel sun wheel adapted to be driven by said driving shaft and to slide axially with respect to the same, a relatively stationary bevel sun wheel, planetary pinions rotatably supported by said driven shaft and meshing with both sun wheels and an adjustable stop piece for limiting the axial motion of said rotary wheel.

2. In combination with a driving shaft and a driven shaft: a differential speed reducing mechanism comprising a rotary bevel sun wheel adapted to be driven by said driving shaft, a relatively stationary bevel sun wheel, planetary pinions rotatably supported by said driven shaft and meshing with both sun wheels and means whereby said rotary wheel is floatingly supported upon said driving shaft and is centered solely by its engagement with said pinions.

3. In combination with a driving shaft and a driven shaft: a differential speed reducing mechanism comprising a rotary bevel sun wheel adapted to be driven by said driving shaft, a relatively stationary bevel sun wheel, planetary pinions rotatably supported by said driven shaft and meshing with both sun wheels and a stop piece of adjustable position, said rotary sun wheel being floatingly supported between said pinions and said stop piece.

4. In combination with a driving shaft and a driven shaft: a differential speed reducing mechanism comprising a rotary bevel sun wheel, means for positively connecting said driving shaft with said wheel and whereby the latter is adapted to assume slightly eccentric and inclined positions relatively to the former, a relatively stationary bevel sun wheel, planetary pinions rotatably supported by said driven shaft and meshing with both sun wheels and a stop piece of adjustable position, said rotary sun wheel being floatingly supported between said pinions and said stop piece.

5. In combination with a driving shaft and a driven shaft: a differential speed reducing mechanism comprising a rotary bevel sun wheel, two cooperating series of flutes respectively provided on said driving shaft and on said wheel and whereby the latter may be rotated by the former, an axial play being left between the flutes of said driving shaft and the flutes of said wheel so as to provide for slight transverse displacements of said wheel, a relatively stationary bevel sun wheel, planetary pinions rotatably supported by said driven shaft and meshing with both sun wheels and a stop piece of adjustable position, said rotary wheel being floatingly supported between said pinions and said stop piece.

6. In combination with a driving shaft and a driven shaft: a differential speed reducing mechanism comprising a rotary bevel sun wheel adapted to be driven by said driving shaft, a relatively stationary bevel sun wheel, planetary pinions rotatably supported by said driven shaft and meshing with both sun wheels and a screwthreaded ring adjustably screwed upon said driven shaft, said rotary wheel being floatingly supported between said pinions and said ring.

7. In combination with a driving shaft, a driven shaft and a stationary casing containing said shafts: a differential speed reducing mechanism comprising a rotary bevel sun wheel adapted to be driven by said driving shaft, a relatively stationary bevel sun wheel, means for securing said stationary sun wheel to said casing and whereby the latter wheel is adapted to assume slightly eccentric and inclined positions relatively to said driven shaft, planetary pinions rotatably supported by said driven shaft and meshing with both sun wheels and a stop piece of adjustable position, the rotary sun wheels being floatingly supported between said pinions and said stop piece while the stationary sun wheel is floatingly supported between said pinions and said casing.

8. In combination with a driving shaft, a driven shaft and a stationary casing containing said shafts: a differential speed reducing mechanism comprising a rotary bevel sun wheel adapted to be driven by said driving shaft, a relatively stationary bevel sun wheel, two cooperating series of flutes respectively provided on said casing and on said stationary sun wheel and whereby the latter is prevented from rotating, an axial play being left between the flutes of said casing and the flutes of said wheel so as to provide for slight transverse displacements of said wheel, planetary pinions rotatably supported by said driven shaft and meshing with both sun wheels, and a stop piece of adjustable position, the rotary sun wheel being floatingly supported between said pinions and said stop piece while the stationary sun wheel is floatingly supported between said pinions and said casing.

9. In a differential speed reducing bevel gear between a driving shaft and a driven shaft, means for supporting the rotary sun wheel of said gear in a floating manner and whereby the position of the same is adjustable independently of said driving shaft.

10. In a differential speed reducing bevel gear between a driving shaft and a driven shaft, means whereby both sun wheels of said gear are supported in a floating manner and the position of each of said wheels is adjustable independently of said driving shaft.

11. In a differential speed reducing gear between a hollow driving shaft and a hollow driven shaft, hollow and substantially radial arms carried by said driven shaft for rotatably supporting the planetary pinions of said gear, a bearing supporting the end of the driving shaft adjacent the driven shaft, the adjacent end of said driven shaft extending axially through said end of the driving shaft and being supported by the part of the same contained within said bearing, means for lubricating said bearing and ports affording successive communication for the lubricant between said bearing, the interior of the driven shaft and of said arms, the bearings for said planetary pinions and the exterior of the gear and whereby the lubrication of said latter bearings is facilitated by centrifugal effect.

12. In a differential speed reducing gear between a hollow driving shaft and a hollow driven shaft, hollow and substantially radial arms carried by said driven shaft for rotatably supporting the planetary pinions of said gear, a bearing supporting the end of the driving shaft adjacent the driven shaft, the adjacent end of said driven shaft extending axially through said end of the driving shaft and being supported by the part of the same contained within said bearing, means for lubricating said bearing, ports affording communication between the interior of the driven shaft and said bearing, ports affording communication between the interior of said arms and the bearings for said planetary pinions and outlet ports for the lubricant provided through said latter bearings beyond said latter ports relatively to said driven shaft.

13. In a differential speed reducing gear between a hollow driving shaft and a hollow driven shaft, hollow and substantially radial arms carried by said driven shaft for rotatably supporting the planetary pinions of said gear, a bearing supporting the end of the driving shaft adjacent the driven shaft, the adjacent end of said driven shaft extending axially through said end of the driving shaft and being supported by the part of the same contained within said bearing, means for supplying lubricant to said bearing, ports affording successive communication between said bearing, the interior of the driven shaft and of said arms, the bearings for said planetary pinions and the exterior of the gear and whereby the lubrication of said latter bearings is facilitated by centrifugal effect and ports affording independent communication between said bearing and the interior of the driving shaft.

14. In a differential speed reducing gear between a hollow driving shaft and a hollow driven shaft, hollow and substantially radial arms carried by said driven shaft for rotatably supporting the planetary pinions of said gear, a bearing supporting the end of the driving shaft adjacent the driven shaft, the adjacent end of said driven shaft extending axially through said end of the driving shaft and being supported by the part of the same contained within said bearing, means for lubricating said bearing, and ports affording successive communication for the lubricant between said bearing, the interior of the driven shaft and of said arms, the bearings for said planetary pinions and the stationary casing for the gear and whereby the lubricant is forced through said latter bearings by centrifugal effect and escapes into said casing, and means whereby the level of the lubricant in said casing is kept at a height enabling the planetary pinions to dip thereinto at each revolution of said driven shaft.

In testimony whereof I have signed my name to this specification.

CHARLES WASEIGE.